(12) United States Patent
Ablay et al.

(10) Patent No.: US 6,275,585 B1
(45) Date of Patent: Aug. 14, 2001

(54) METHOD FOR REPROGRAMMING A VEHICLE SYSTEM OR A USER SYSTEM IN A VEHICLE

(75) Inventors: Sewim F. Ablay, Dundee; Mark A. Gannon, Sleepy Hollow; Ron G. Akers, Palatine; Bryan A. Thale, Schaumburg, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/067,331

(22) Filed: Apr. 28, 1998

(51) Int. Cl.[7] ..................................................... H04K 1/00
(52) U.S. Cl. .............................. 380/2; 380/270; 380/272; 713/168; 713/169; 713/190; 713/200
(58) Field of Search ...................................... 341/173–175, 341/180, 181; 342/62–72; 340/825.69, 825.72, 853.1–853.3, 870.01–870.16, 901–905, 906–983, 986–996, 425.5, 643; 380/2, 24, 270, 272; 369/6, 24–33; 370/312–489; 364/468.15–468.2; 307/10.1–10.8; 902/10, 39; 371/68.2; 395/240.47–308; 375/310–316; 455/404–575, 151.1, 92, 99, 189, 345–351; 713/168, 169, 190, 200

(56) References Cited

U.S. PATENT DOCUMENTS

| | | | |
|---|---|---|---|
| 5,157,610 | * | 10/1992 | Asano et al. ................... 364/424.03 |
| 5,278,547 | * | 1/1994 | Suman et al. ................... 340/825.32 |
| 5,479,157 | * | 12/1995 | Suman et al. ................... 340/825.31 |
| 5,619,412 | * | 4/1997 | Hapka .......................... 364/424.045 |
| 5,627,529 | * | 5/1997 | Duckworth et al. ............ 340/825.69 |
| 5,673,017 | * | 9/1997 | Dery et al. ........................... 340/426 |
| 5,787,367 | * | 7/1998 | Berra ..................................... 701/1 |
| 5,838,251 | * | 11/1998 | Brinkmeyer et al. ........... 340/825.31 |
| 5,884,202 | * | 3/1999 | Arjomand ........................... 340/439 |
| 5,884,210 | * | 3/1999 | Rettig et al. ......................... 701/115 |
| 5,884,211 | * | 3/1999 | Pauli et al. .......................... 701/115 |

* cited by examiner

Primary Examiner—Tod Swann
Assistant Examiner—Paul E. Callahan
(74) Attorney, Agent, or Firm—Wayne J. Egan; John J. King

(57) ABSTRACT

A communication system (100) includes an infrastructure (150) and at least one vehicle (101), the vehicle including at least one vehicle system (103), and at least one user system (113). The infrastructure includes an application (155) which, in turn, is arranged to reprogram the vehicle system, the user system, or both.

92 Claims, 4 Drawing Sheets

METHOD FOR REPROGRAMMING A VEHICLE SYSTEM OR A USER SYSTEM IN A VEHICLE

FIELD OF THE INVENTION

This application relates to telematics including, but not limited to, a method for reprogramming a vehicle system or a user system in a vehicle.

BACKGROUND OF THE INVENTION

It is known for a vehicle, such as a car, to have both a vehicle bus and a user bus. As known, typically the vehicle bus supports the various vehicle systems, such as a motive power source (such as, for example, an internal combustion engine, electric engine, or other source of motive power that might be developed in the future), instrument display, door locks, flashing lights, etc. Also, typically the user bus supports various user systems, such as a cell phone, a radio frequency ("RF") data device, a pager, entertainment system, a global positioning satellite ("GPS") receiver, etc.

As known, the vehicular bus contains various proprietary information and safety-related information such as, for example, an anti-theft system computer program or an anti-lock braking system computer program. As a result, generally the user bus is not directly coupled to the vehicular bus; instead, the user bus is coupled to the vehicular bus by means of a vehicular gateway.

As is known, from time to time there is a need to reprogram one or more vehicle systems. For example, periodically it is necessary to reprogram the motive power source which, in terms of a typical internal combustion engine, is currently known as "tuning" the engine. Likewise, periodically it is necessary to adjust the braking system, etc.

Also as known, from time to time there is a need to reprogram one or more user systems. For example, periodically it might be necessary to reprogram a cell phone with current dialing information. Likewise, periodically it might be necessary to reprogram a vehicle entertainment system with current entertainment channels or game software, etc.

Due to the safety-related and confidential nature of the vehicle and user systems, it is desirable that the reprogramming of these vehicle and user systems be limited to authorized persons or entities.

As a result, there is a need for a method for reprogramming a vehicle system or a user system in a vehicle in a secure manner.

DESCRIPTION OF THE PREFERRED EMBODIMENTS

Figure 1:
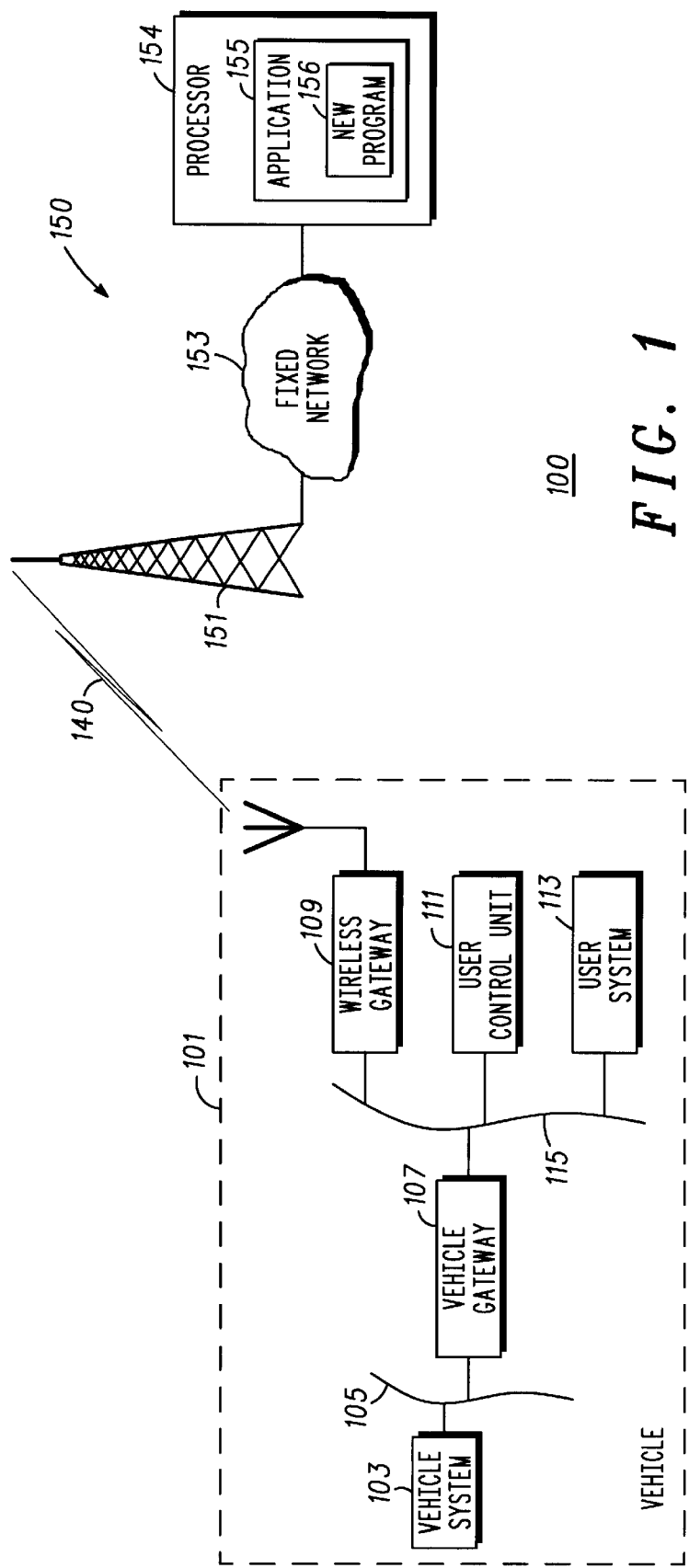
FIG. 1 is a block diagram of a first embodiment of a vehicle 101 and infrastructure that may be used to demonstrate a method for reprogramming a vehicle system or a user system in a vehicle.

Referring now to FIG. 1, there is shown a communication system 100 having an infrastructure 150 and at least one vehicle 101. As shown, the at least one vehicle 101 includes one or more vehicle systems (represented by the vehicle system 103), a vehicle gateway 107, a wireless gateway 109, a user control unit 111, and one or more user systems (represented by the user system 113). Further, as shown, each of the one or more vehicle systems is coupled to the vehicle gateway 107 by means of a vehicle bus 105. Also, each of the one or more user systems is coupled to the vehicle gateway 107 by means of a user bus 115. Moreover, each of the user control unit and the wireless gateway 109 are coupled to the vehicle gateway 107 by means of the user bus 115.

The vehicle system 103 includes a vehicle system status. The vehicle system status includes, for example, at least one of a current date, a current time, a current location of the vehicle, a current mileage of the vehicle, a vehicle identification number, a current age of the vehicle, an on/off status of the vehicle, a billing information, an account information, a user information, a current hardware version, a current software version, and the like.

As well, the user system 113 includes a user system status. The user system status includes, for example, at least one of a current date, a current time, a current location of the vehicle, a current mileage of the vehicle, a vehicle identification number, a user system identification number, a current age of the vehicle, a current age of the user system, an on/off status of the vehicle, an on/off status of the user system, a billing information, an account information, a user information, a current hardware version, a current software version, and the like.

Still referring to FIG. 1, the infrastructure includes a wireless base station 151 coupled to a fixed network 153. In turn, the fixed network is coupled to a processor 154. As shown, the processor includes an application 155 which, in turn, includes a new program 156.

As shown, the wireless gateway 109 communicates with the infrastructure by means of a radio frequency communication link 140.

Figure 2:
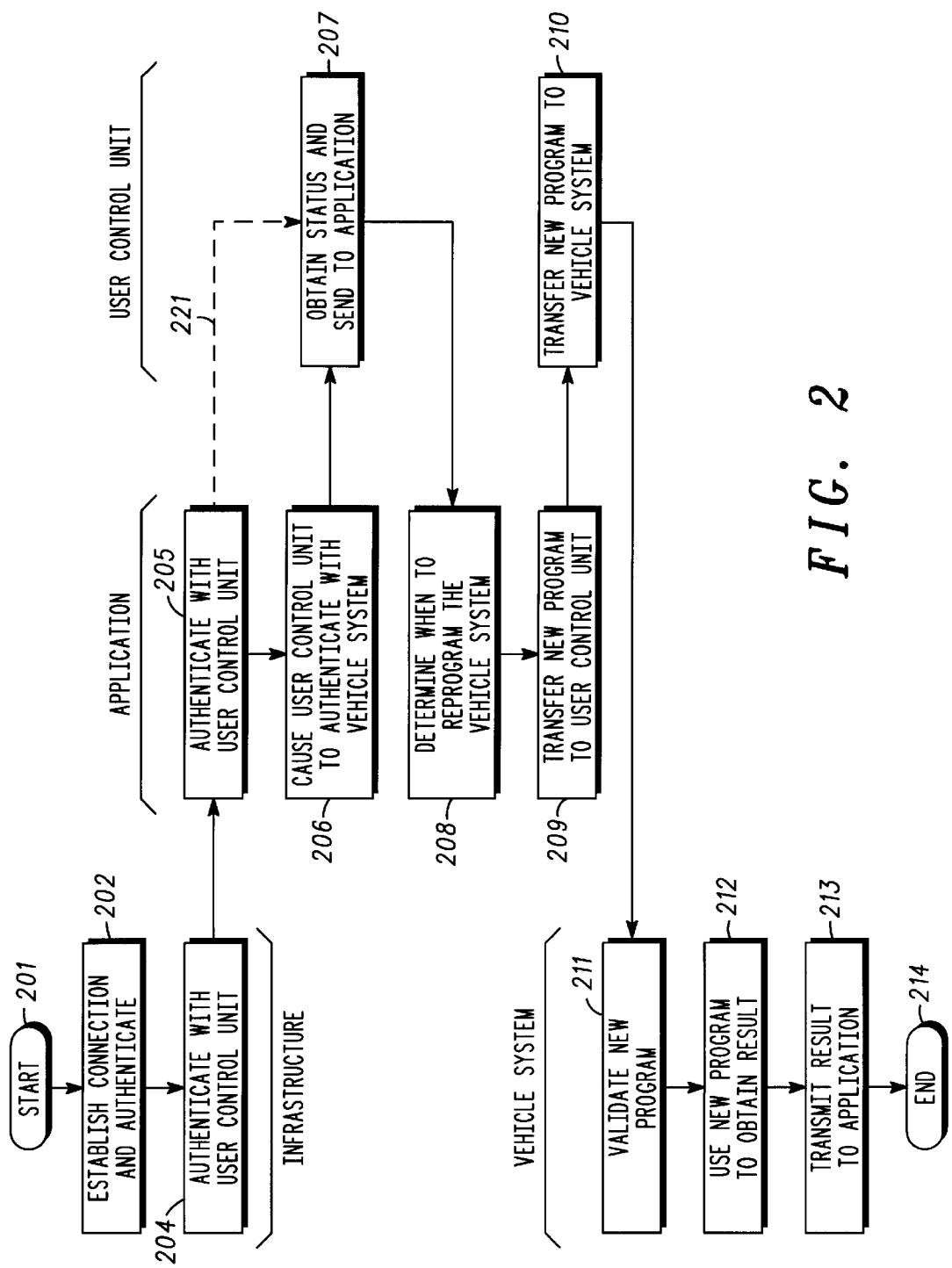
FIG. 2 is a flow diagram for a method for reprogramming a vehicle system, in accordance with the present invention.

Referring now to FIG. 2, there is shown a flow diagram for a method for reprogramming a vehicle system, in accordance with the present invention. As shown, FIG. 2 comprises steps 201–214, of which steps 202–204 are initiated by the infrastructure 150; steps 205–206 and 208–209 are initiated by the application 155; steps 207 and 210 are initiated by the user control unit 111; and steps 211–213 are initiated by the vehicle system 103.

The process starts, step 201, and then proceeds to step 202.

In step 202, the infrastructure establishes a connection with the wireless gateway, and then establishes a routable authenticated connection with the wireless gateway. The process then proceeds to step 204.

In step 204, the infrastructure authenticates itself with the user control unit. The process then goes to step 205.

In step 205, the application authenticates itself with the user control unit.

In a first embodiment (corresponding to claims 3 and 50 below), after step 205 the process goes to step 206 and thereafter to step 207. Conversely, in a second embodiment (corresponding to claim 73 below), after step 205 the process goes directly to step 207 (represented by the dotted line path 221).

In step 206, the application causes the user control unit to be authenticated with the vehicle system. In one embodiment (corresponding to claim 3 below), the user control unit is authenticated with the vehicle system by means of the vehicle gateway. The process then goes to step 207.

In step 207, the user control unit obtains the vehicle system status and sends the vehicle system status to the application. The process then goes to step 208.

In step 208, the application, based on the vehicle system status, determines when to reprogram the vehicle system. When the application determines to reprogram the vehicle system, the process goes to step 209.

In step 209, the application transfers the new program 156 to the user control unit. The process then goes to step 210.

In step 210, the user control unit transfers the new program to the vehicle system. The process then goes to step 211.

In step 211, the vehicle system validates the new program. In the alternate encryption embodiment described above, the vehicle system also decrypts the new program. The process then goes to step 212.

In step 212, the vehicle system uses the new program to obtain a result. The process then goes to step 213.

In step 213, the vehicle system transmits the result to the application.

The process then ends, step 214.

In an encrypted new program embodiment, the above process of FIG. 2 includes a step by the application of encrypting the new program, thus forming an encrypted new program, prior to transferring it to the user control unit. Thereafter in this embodiment, the encrypted new program may be decrypted either by the user control unit or by the vehicle system.

Likewise, in an encrypted vehicle system status embodiment, the above process includes a step, either by the vehicle system or by the user control unit, of encrypting the vehicle system status, thus forming an encrypted vehicle system status. As well, this embodiment includes a subsequent step, by the application, of decrypting the encrypted vehicle system status.

In one embodiment, the vehicle system 103 comprises a motive power source (such as, for example, an engine) and the new program is arranged to modify or improve an operation of the motive power source.

In another embodiment, the vehicle system comprises a transmission and the new program is arranged to modify or improve an operation of the transmission.

In still another embodiment, the vehicle system comprises brakes and the new program is arranged to modify or improve an operation of the brakes.

It will be appreciated that the vehicle system(s) may comprise other functions not specifically enumerated herein.

In one embodiment, the new program comprises executable code.

In another embodiment, the new program comprises one or more data files.

In a further embodiment, the new program comprises one or more requests or commands.

In still another embodiment, the new program comprises executable code, one or more data files and one or more requests or commands.

Figure 3:
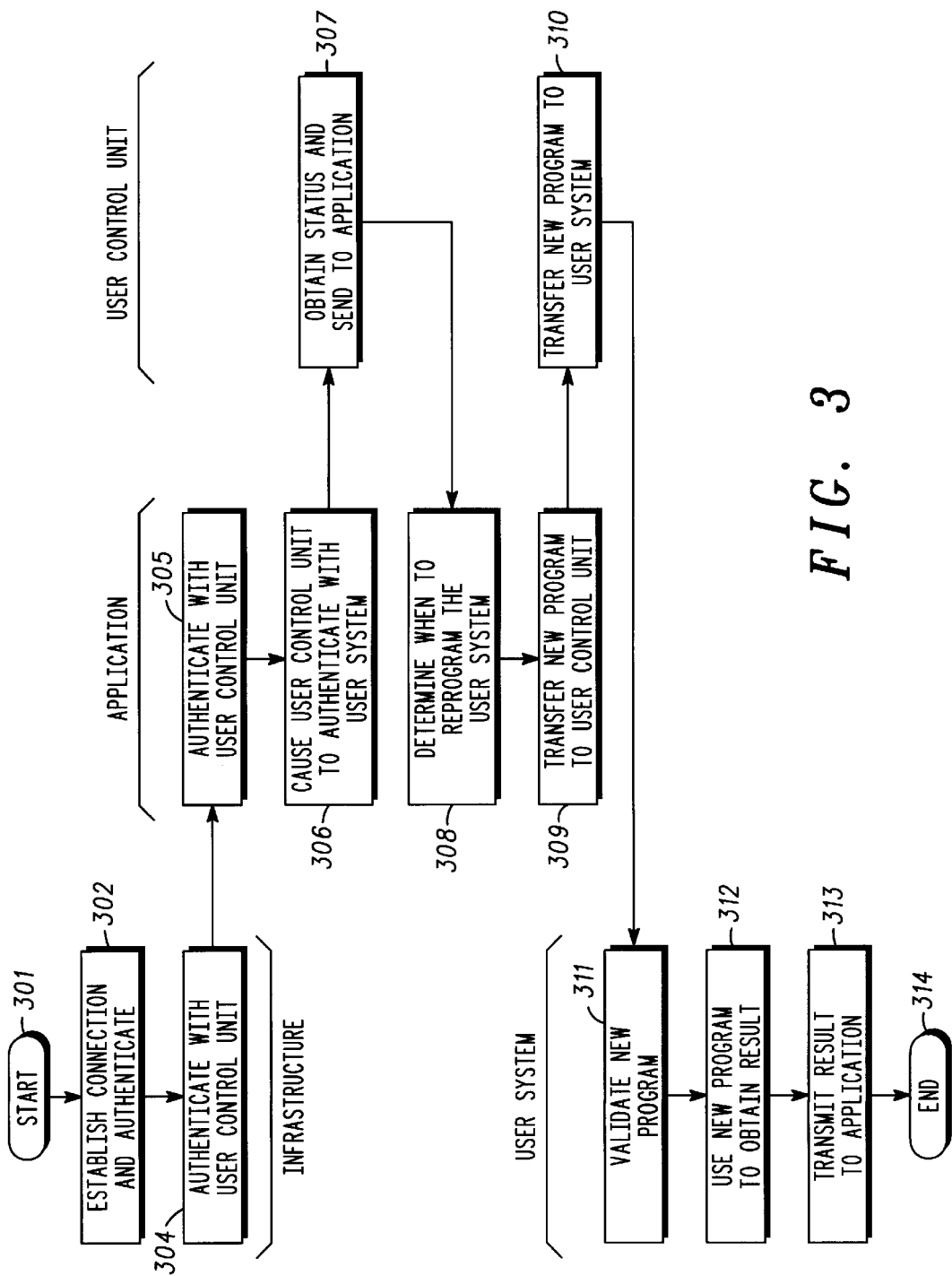
FIG. 3 is a flow diagram for a method for reprogramming a user system, in accordance with the present invention.

Referring now to FIG. 3, there is shown a flow diagram for a method for reprogramming a user system, in accordance with the present invention. As shown, FIG. 3 comprises steps 301–314, of which steps 302–304 are initiated by the infrastructure 150; steps 305–306 and 308–309 are initiated by the application 155; steps 307 and 310 are initiated by the user control unit 111; and steps 311–313 are initiated by the user system 113.

The process starts, step 301, and then proceeds to step 302. In step 302, the infrastructure establishes a connection with the wireless gateway and then establishes a routable authenticated connection with the wireless gateway. The process then goes to step 304.

In step 304, the infrastructure authenticates itself with the user control unit. The process then goes to step 305.

In step 305, the application authenticates itself with the user control unit. The process then goes to step 306.

In step 306, the application causes the user control unit to be authenticated with the user system. The process then goes to step 307.

In step 307, the user control unit obtains the user system status and then sends the user system status to the application. The process then goes to step 308.

In step 308, the application, based on the user system status, determines when to reprogram the user system. When the application determines to reprogram the user system, the process goes to step 309.

In step 309, the application transfers the new program to the user control unit. The process then goes to step 310.

In step 310, the user control unit transfers the new program to the user system. The process then goes to step 311.

In step 311, the user system validates the new program. The process then goes to step 312.

In step 312, the user system uses the new program to obtain a result. The process then goes to step 313.

In step 313, the user system transmits the result to the application.

The process then ends, step 314.

In an encrypted new program embodiment, the above process of FIG. 3 includes a step by the application of encrypting the new program, thus forming an encrypted new program, prior to transferring it to the user control unit. Thereafter in this embodiment, the encrypted new program may be decrypted either by the user control unit or by the user system.

Likewise, in an encrypted user system status embodiment, the above process includes a step, either by the user system or by the user control unit, of encrypting the user system status, thus forming an encrypted user system status. As well, this embodiment includes a subsequent step, by the application, of decrypting the encrypted user system status.

In one embodiment, the user system comprises an entertainment system and the new program is arranged to modify or improve an operation of the entertainment system.

In another embodiment, the user system comprises a personal computer and the new program is arranged to modify or improve an operation of the personal computer.

In a further embodiment, the user system comprises a navigation system and the new program is arranged to modify or improve an operation of the navigation system.

In a still further embodiment, the user system comprises a user interface device and the new program is arranged to modify or improve an operation of the user interface. In one embodiment, for example, the user interface device comprises a cellular phone, pager, two-way radio, interface of a personal computer, or the like.

It will be appreciated that the user system(s) may comprise other functions not specifically enumerated herein.

In one embodiment, the new program comprises executable code.

In another embodiment, the new program comprises one or more data files.

In a further embodiment, the new program comprises one or more requests or commands.

In still another embodiment, the new program comprises executable code, one or more data files and one or more requests or commands.

Figure 4:
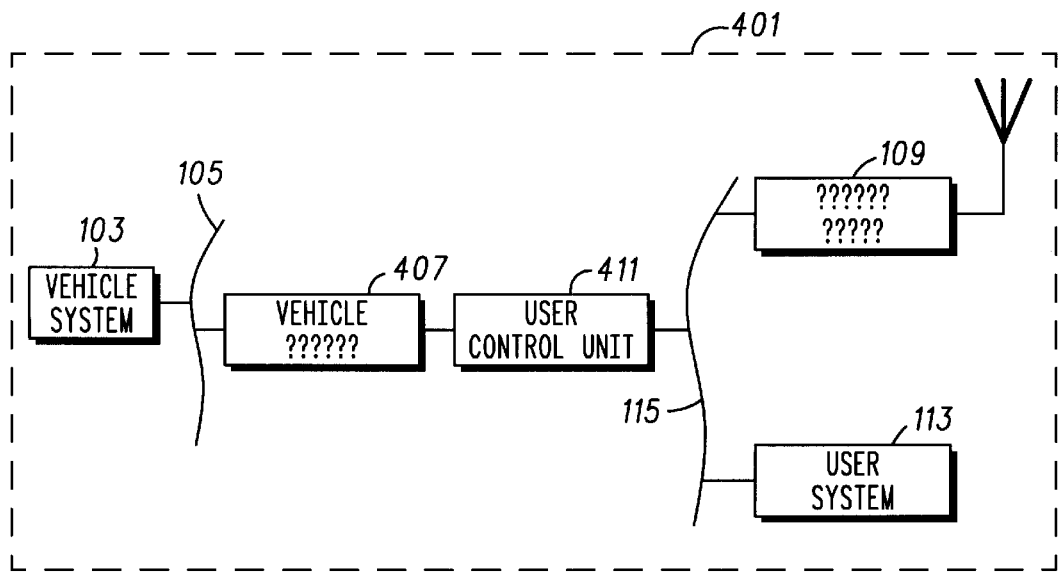
FIG. 4 is a block diagram of a second embodiment of a vehicle 401 that may be used to demonstrate the present invention.

Referring now to FIG. 4, there is shown a block diagram of a second embodiment of a vehicle 401 that may be used to demonstrate the present invention. As shown the vehicle 401 includes a vehicle system 103, a vehicle bus 105, a vehicle gateway 407, a user control unit 411, a user bus 115, a wireless gateway 109 and a user system 113. As shown, the vehicle system is coupled to the vehicle bus; and the wireless gateway and the user system are coupled to the user bus. Also as shown, the vehicle bus is coupled to the vehicle gateway which, in turn, is coupled in series with the user control unit which, in turn, is coupled to the user bus.

Figure 5:
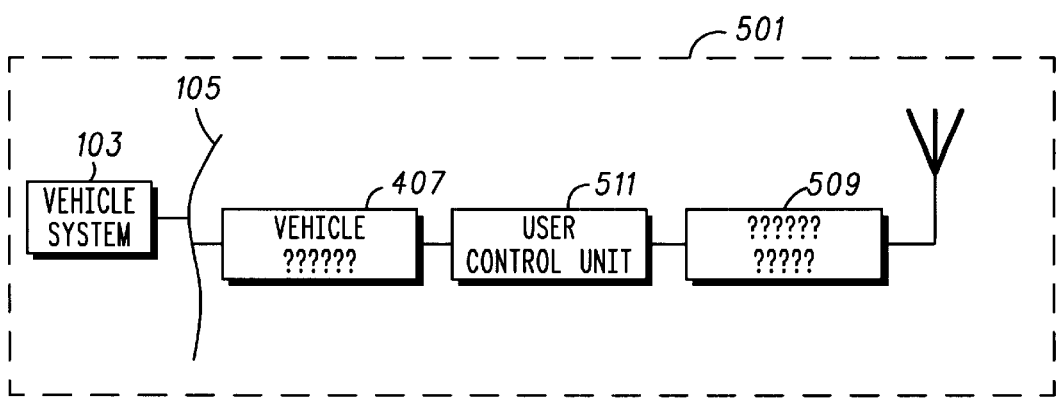
FIG. 5 is a block diagram of a third embodiment of a vehicle 501 that may be used to demonstrate the present invention.

Referring now to FIG. 5, there is shown a block diagram of a third embodiment of a vehicle 501 that may be used to demonstrate the present invention. As shown the vehicle 501 includes a vehicle system 103, a vehicle bus 105, a vehicle gateway 407, a user control unit 511 and a wireless gateway 509. As shown, the vehicle system is coupled to the vehicle bus. Also as shown, the vehicle bus is coupled to the vehicle gateway which, in turn, is coupled in series with the user control unit which, in turn, is coupled to the wireless gateway.

Figure 6:
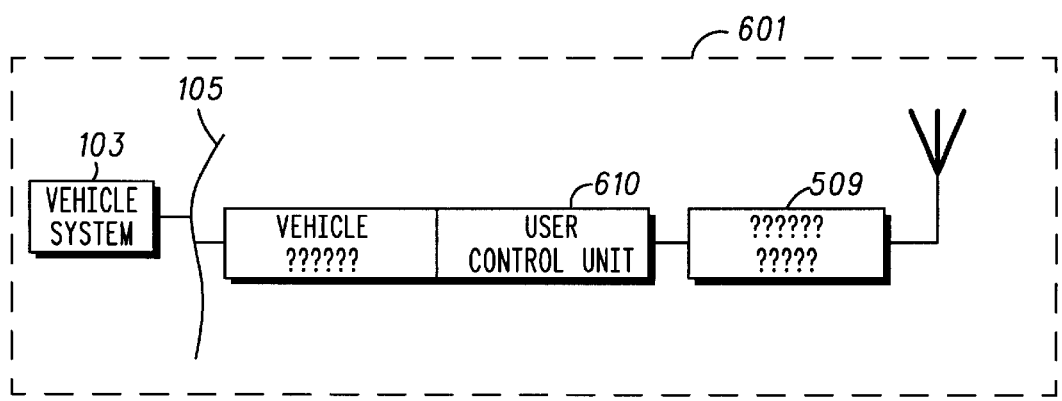
FIG. 6 is a block diagram of a fourth embodiment of a vehicle 601 that may be used to demonstrate the present invention.
Figure 4:
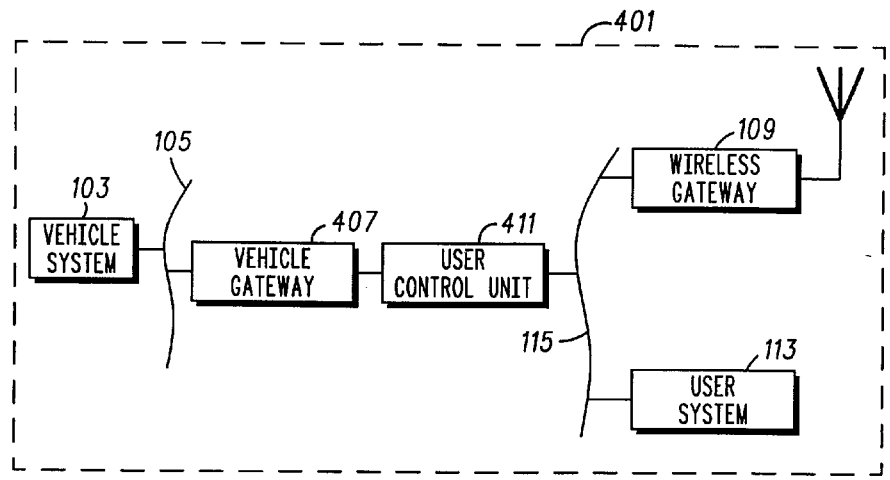
Figure 5:
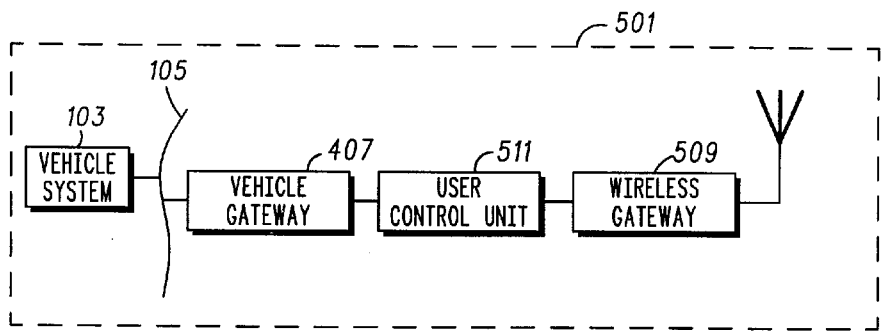
Figure 6:
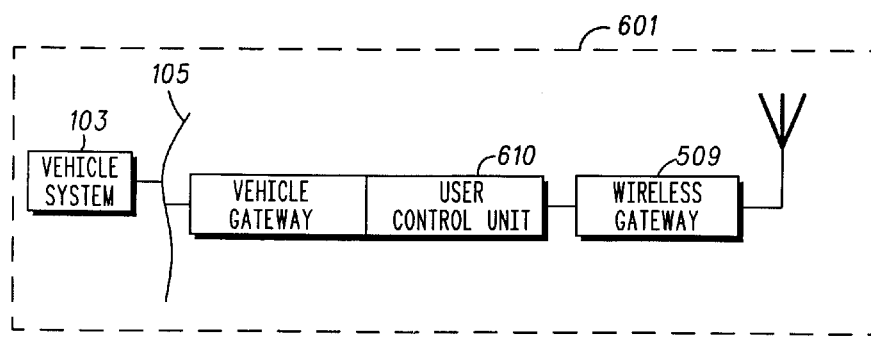

Referring now to FIG. 6, there is shown a block diagram of a fourth embodiment of a vehicle 601 that may be used to demonstrate the present invention. As shown the vehicle 601 includes a vehicle system 103, a vehicle bus 105, a single, combined vehicle gateway-user control unit 610 and a wireless gateway 509. As shown, the vehicle system is coupled to the vehicle bus. Also as shown, the vehicle bus is coupled to the combined vehicle gateway-user control unit 610 which, in turn, is coupled to the wireless gateway 509.

It will be appreciated that other combinations of the vehicle system(s), vehicle gateway, wireless gateway, user control unit and user system(s) are possible.

Some advantages of a method for reprogramming a vehicle system or a user system in a vehicle, in accordance with the present invention, are now discussed.

The invention allows remotely-located persons or entities to reprogram a vehicle system or a user system in a vehicle in a secure manner. This results in advantages of lower cost as well as increased convenience, flexibility and reliability.

We claim:

1. In a communication system having an infrastructure and a vehicle, the vehicle including one or more vehicle systems, a vehicle gateway, a wireless gateway and a user control unit, each of the one or more vehicle systems coupled to the vehicle gateway, the wireless gateway coupled to the vehicle gateway, the user control unit coupled to the vehicle gateway, the infrastructure including an application, a method for the application to transfer executable code to reprogram a vehicle system of the one or more vehicle systems, comprising the steps of:

(a) by the infrastructure, establishing a connection with the wireless gateway;

(b) by the infrastructure, establishing a routable authenticated connection with the wireless gateway; and (c) by the infrastructure, authenticating itself with the user control unit.

2. The method of claim 1, including the step of:

(d) by the application, authenticating itself with the user control unit.

3. The method of claim 2, including the step of:

(e) by the application, causing the user control unit to be authenticated with the vehicle system by means of the vehicle gateway.

4. The method of claim 3, the vehicle system including a vehicle system status and including the step of:

(f) by the user control unit, obtaining the vehicle system status and sending the vehicle system status to the application.

5. The method of claim 4, including the step of:

(g) by the application, based on the vehicle system status, determining when to reprogram the vehicle system.

6. The method of claim 5, the application including a new program, and including the steps of:

(h) by the application, transferring the new program to the user control unit; and (i) by the user control unit, transferring the new program to the vehicle system.

7. The method of claim 4, the vehicle system status including at least one of a current date, a current time, a current location of the vehicle, a current mileage of the vehicle, a vehicle identification number, a current age of the vehicle, an on/off status of the vehicle, a billing information, an account information, a user information, a current hardware version and a current software version.

8. The method of claim 6, including the step of:

(j) by the vehicle system, validating the new program.

9. The method of claim 8, including the step of:

(k) by the vehicle system, using the new program to obtain a result.

10. The method of claim 9, including the step of:

(l) by the vehicle system, transmitting the result to the application.

11. The method of claim 6, including the step of:

by the application, encrypting the new program and, by the vehicle system, decrypting the new program.

12. The method of claim 6, including the step of:

by the application, encrypting the new program and, by the user control unit, decrypting the new program.

13. The method of claim 4, including the step of:

by the vehicle system, encrypting the vehicle system status and, by the application, decrypting the vehicle system status.

14. The method of claim 4, including the step of:

by the user control unit, encrypting the vehicle system status and, by the application, decrypting the vehicle system status.

15. The method of claim 6, the vehicle system comprising a motive power source and the new program arranged to modify or improve an operation of the motive power source.

16. The method of claim 6, the vehicle system comprising a transmission and the new program arranged to modify or improve an operation of the transmission.

17. The method of claim 6, the vehicle system comprising brakes and the new program arranged to modify or improve an operation of the brakes.

18. The method of claim 1, the vehicle including a vehicle bus, the vehicle bus coupled to the vehicle system and the vehicle gateway.

19. The method of claim 18, the vehicle further including a user bus.

20. The method of claim 19, the user bus coupled to the vehicle gateway, the wireless gateway and the user control unit.

21. The method of claim 6, the new program comprising executable code.

22. The method of claim 6, the new program comprising one or more data files.

23. The method of claim 6, the new program comprising one or more requests or commands.

24. In a communication system having an infrastructure and a vehicle, the vehicle including one or more user systems, a wireless gateway and a user control unit, each of the one or more user systems coupled to one another, and to the wireless gateway and the user control unit, the infrastructure including an application, a method for the application to transfer executable code to reprogram a user system of the one or more user systems, comprising the steps of:
(a) by the infrastructure, establishing a connection with the wireless gateway;
(b) by the infrastructure, establishing a routable authenticated connection with the wireless gateway; and
(c) by the infrastructure, authenticating itself with the user control unit.

25. The method of claim 24, including the step of:
(d) by the application, authenticating itself with the user control unit.

26. The method of claim 25, including the step of:
(e) by the application, causing the user control unit to be authenticated with the user system.

27. The method of claim 26, the user system including a user system status and including the step of:
(f) by the user control unit, obtaining the user system status and sending the user system status to the application.

28. The method of claim 27, including the step of:
(g) by the application, based on the user system status, determining when to reprogram the user system.

29. The method of claim 28, the application including a new program, and including the steps of:
(h) by the application, transferring the new program to the user control unit; and
(i) by the user control unit, transferring the new program to the user system.

30. The method of claim 27, the user system status including at least one of a current date, a current time, a current location of the vehicle, a current mileage of the vehicle, a vehicle identification number, a user system identification number, a current age of the vehicle, a current age of the user system, an on/off status of the vehicle, an on/off status of the user system, a billing information, an account information, a user information, a current hardware version and a current software version.

31. The method of claim 29, including the step of:
(j) by the user system, validating the new program.

32. The method of claim 31, including the step of:
(k) by the user system, using the new program to obtain a result.

33. The method of claim 32, including the step of:
(l) by the user system, transmitting the result to the application.

34. The method of claim 29, including the step of:
by the application, encrypting the new program and, by the user system, decrypting the new program.

35. The method of claim 29, including the step of:
by the application, encrypting the new program and, by the user control unit, decrypting the new program.

36. The method of claim 27, including the step of:
by the user system, encrypting the user system status and, by the application, decrypting the user system status.

37. The method of claim 27, including the step of:
by the user control unit, encrypting the user system status and, by the application, decrypting the user system status.

38. The method of claim 29, the user system comprising an entertainment system and the new program arranged to modify or improve an operation of the entertainment system.

39. The method of claim 29, the user system comprising a personal computer and the new program arranged to modify or improve an operation of the personal computer.

40. The method of claim 29, the user system comprising a navigation system and the new program arranged to modify or improve an operation of the navigation system.

41. The method of claim 29, the user system comprising a user interface device and the new program arranged to modify or improve an operation of the user interface device.

42. The method of claim 41, the user interface device comprising a cellular phone.

43. The method of claim 41, the user interface device comprising a pager.

44. The method of claim 41, the user interface device comprising a two-way radio.

45. The method of claim 41, the user interface device comprising an interface of a personal computer.

46. The method of claim 24, the vehicle including a user bus, the user bus coupled to the wireless gateway, the user control unit and the user system.

47. The method of claim 29, the new program comprising executable code.

48. The method of claim 29, the new program comprising one or more data files.

49. The method of claim 29, the new program comprising one or more requests or commands.

50. In a communication system having an infrastructure and a vehicle, the vehicle including one or more vehicle systems, a vehicle gateway, a wireless gateway and a user control unit, each of the one or more vehicle systems coupled to the vehicle gateway, the wireless gateway coupled to the vehicle gateway, the user control unit coupled to the vehicle gateway, the infrastructure including an application, a method for the application to transfer executable code to reprogram a vehicle system of the one or more vehicle systems, comprising the steps of:
(a) by the infrastructure, establishing a connection with the wireless gateway;
(b) by the infrastructure, establishing a routable authenticated connection with the wireless gateway; and
(c) by the infrastructure, authenticating itself with the user control unit;
(d) by the application, authenticating itself with the user control unit; and
(e) by the application, causing the user control unit to be authenticated with the vehicle system.

51. The method of claim 50, the vehicle system including a vehicle system status and including the step of:
  (f) by the user control unit, obtaining the vehicle system status and sending the vehicle system status to the application.

52. The method of claim 51, including the step of:
  (g) by the application, based on the vehicle system status, determining when to reprogram the vehicle system.

53. The method of claim 52, the application including a new program, and including the steps of:
  (h) by the application, transferring the new program to the user control unit; and
  (i) by the user control unit, transferring the new program to the vehicle system.

54. The method of claim 51, the vehicle system status including at least one of a current date, a current time, a current location of the vehicle, a current mileage of the vehicle, a vehicle identification number, a current age of the vehicle, an on/off status of the vehicle, a billing information, an account information, a user information, a current hardware version and a current software version.

55. The method of claim 53, including the step of:
  (j) by the vehicle system, validating the new program.

56. The method of claim 55, including the step of:
  (k) by the vehicle system, using the new program to obtain a result.

57. The method of claim 56, including the step of:
  (l) by the vehicle system, transmitting the result to the application.

58. The method of claim 53, including the step of:
  by the application, encrypting the new program and, by the vehicle gateway, decrypting the new program.

59. The method of claim 53, including the step of:
  by the application, encrypting the new program and, by the user control unit, decrypting the new program.

60. The method of claim 51, including the step of:
  by the vehicle gateway, encrypting the vehicle system status and, by the application, decrypting the vehicle system status.

61. The method of claim 51, including the step of:
  by the user control unit, encrypting the vehicle system status and, by the application, decrypting the vehicle system status.

62. The method of claim 53, the vehicle system comprising a motive power source and the new program arranged to modify or improve an operation of the motive power source.

63. The method of claim 53, the vehicle system comprising a transmission and the new program arranged to modify or improve an operation of the transmission.

64. The method of claim 53, the vehicle system comprising brakes and the new program arranged to modify or improve an operation of the brakes.

65. The method of claim 50, the vehicle including a vehicle bus.

66. The method of claim 65, the vehicle bus coupled to the vehicle system and the vehicle gateway.

67. The method of claim 65, the vehicle further including a user bus.

68. The method of claim 67, the user bus coupled to the wireless gateway and the user control unit.

69. The method of claim 68, the user bus further coupled to the vehicle gateway.

70. The method of claim 53, the new program comprising executable code.

71. The method of claim 53, the new program comprising one or more data files.

72. The method of claim 53, the new program comprising one or more requests or commands.

73. In a communication system having an infrastructure and a vehicle, the vehicle including one or more vehicle systems, a vehicle gateway, a wireless gateway and a user control unit,
  each of the one or more vehicle systems coupled to the vehicle gateway,
  the wireless gateway coupled to the vehicle gateway,
  the user control unit coupled to the vehicle gateway,
  the infrastructure including an application,
  a method for the application to transfer executable code to reprogram a vehicle system of the one or more vehicle systems, the vehicle system including a vehicle system status, the method comprising the steps of:
    (a) by the infrastructure, establishing a connection with the wireless gateway;
    (b) by the infrastructure, establishing a routable authenticated connection with the wireless gateway;
    (c) by the infrastructure, authenticating itself with the user control unit;
    (d) by the application, authenticating itself with the user control unit; and
    (e) by the user control unit, obtaining the vehicle system status and sending the vehicle system status to the application.

74. The method of claim 73, including the step of:
  (f) by the application, based on the vehicle system status, determining when to reprogram the vehicle system.

75. The method of claim 74, the application including a new program, and including the steps of:
  (g) by the application, transferring the new program to the user control unit;
  (h) by the user control unit, transferring the new program to the vehicle system.

76. The method of claim 75, the vehicle system status including at least one of a current date, a current time, a current location of the vehicle, a current mileage of the vehicle, a vehicle identification number, a current age of the vehicle, an on/off status of the vehicle, a billing information, an account information, a user information, a current hardware version and a current software version.

77. The method of claim 76, including the step of:
  (i) by the vehicle system, validating the new program.

78. The method of claim 75, including the step of:
  (j) by the vehicle system, using the new program to obtain a result.

79. The method of claim 78, including the step of:
  (k) by the vehicle system, transmitting the result to the application.

80. The method of claim 75, including the step of:
  by the application, encrypting the new program and, by the user control unit, decrypting the new program.

81. The method of claim 75, including the step of:
  by the user control unit, encrypting the vehicle system status and, by the application, decrypting the vehicle system status.

82. The method of claim 75, the vehicle system comprising a motive power source and the new program arranged to modify or improve an operation of the motive power source.

83. The method of claim 75, the vehicle system comprising a transmission and the new program arranged to modify or improve an operation of the transmission.

84. The method of claim 75, the vehicle system comprising brakes and the new program arranged to modify or improve an operation of the brakes.

85. The method of claim 73, the vehicle including a vehicle bus.

86. The method of claim 85, the vehicle bus coupled to the vehicle system and the vehicle gateway.

87. The method of claim 85, the vehicle further including a user bus.

88. The method of claim 87, the user bus coupled to the wireless gateway and the user control unit.

89. The method of claim 88, the user bus further coupled to the vehicle gateway.

90. The method of claim 75, the new program comprising executable code.

91. The method of claim 75, the new program comprising one or more data files.

92. The method of claim 75, the new program comprising one or more requests or commands.

* * * * *

UNITED STATES PATENT AND TRADEMARK OFFICE
CERTIFICATE OF CORRECTION

PATENT NO. : 6,275,585 B1
DATED : August 14, 2001
INVENTOR(S) : Ablay et al.

It is certified that error appears in the above-identified patent and that said Letters Patent is hereby corrected as shown below:

Please substitute the attached FIG. 4, FIG. 5, and FIG. 6 for the drawings shown on Sheet 4 of 4.

Signed and Sealed this

Thirteenth Day of May, 2003

JAMES E. ROGAN
*Director of the United States Patent and Trademark Office*